US012681966B2

(12) United States Patent
Aliaga et al.

(10) Patent No.: US 12,681,966 B2
(45) Date of Patent: Jul. 14, 2026

(54) SYSTEM FOR THE INTERPRETATION AND QUERYING OF CONTENT GENERATED BY AN ARTIFICIAL INTELLIGENCE MODEL

(71) Applicant: PIERRE DELBET RESEARCH, Abidjan (CI)

(72) Inventors: Christophe Aliaga, Abidjan (CI); Yvan Erbs, Abidjan (CI)

( * ) Notice: Subject to any disclaimer, the term of this patent is extended or adjusted under 35 U.S.C. 154(b) by 179 days.

(21) Appl. No.: 18/525,122

(22) Filed: Nov. 30, 2023

(65) Prior Publication Data

US 2025/0181613 A1 Jun. 5, 2025

(51) Int. Cl.
*G06F 40/289* (2020.01)
*G06F 16/3329* (2025.01)
*G06F 16/338* (2019.01)

(52) U.S. Cl.
CPC ........ *G06F 16/3329* (2019.01); *G06F 16/338* (2019.01); *G06F 40/289* (2020.01)

(58) Field of Classification Search
None
See application file for complete search history.

(56) References Cited

U.S. PATENT DOCUMENTS

| | | | | |
|---|---|---|---|---|
| 2004/0083195 A1* | 4/2004 | McCord | .............. | H04M 3/5233 |
| | | | | 707/999.107 |
| 2017/0019253 A1* | 1/2017 | Baptist | .................... | H04L 67/10 |
| 2018/0089572 A1* | 3/2018 | Aili | ......................... | G06F 9/453 |
| 2023/0074406 A1* | 3/2023 | Baeuml | ............. | G06F 16/90332 |
| 2025/0150446 A1* | 5/2025 | Tilmon | .............. | H04L 63/0815 |
| 2025/0173556 A1* | 5/2025 | Ramarao | ................ | G06N 20/00 |

FOREIGN PATENT DOCUMENTS

| | | | | |
|---|---|---|---|---|
| CA | 2571088 A1 * | 12/2005 | ......... | H04N 21/4325 |
| CN | 109543028 A * | 3/2019 | ............. | G06Q 50/01 |

* cited by examiner

*Primary Examiner* — Quynh H Nguyen
(74) *Attorney, Agent, or Firm* — Patshegen IP; Moshe Pinchas

(57) ABSTRACT

A system for querying interpreted content from a generative artificial intelligence model is disclosed. The system includes a generative artificial intelligence model and one or more processors. The model is configured to accept a natural language text input and produce a human-like text response. The system performs operations including receiving a natural language text input representative of a query subject and a query context, receiving an input representative of a query response structure, amplifying a combination of the inputs, providing the amplified query to the model, receiving the human-like text response generated by the model, accumulating the responses to form a global query response, and providing the global query response to a computerized interface.

13 Claims, 3 Drawing Sheets

100

101 — Defining a query response framework

110 — Receiving a natural language text input representative of a query context

111 — Receiving a query intention | Receiving a query objective — 112

113 — Receiving a query audience | Receiving a query skillset — 114

115 — Receiving an input representative of a query response structure

120 — Setting at least one preset query generation rule

106 — Providing a preset natural language input comprising an incomplete natural language text 107 — Completing 105 — Receiving a natural language text input representative of a query subject 145 — Instantiating 150 — Transposing 125 — Forming a combination 126 — Providing the combination 130 — Receiving the human-like text response 135 — Accumulating 140 — Providing

100

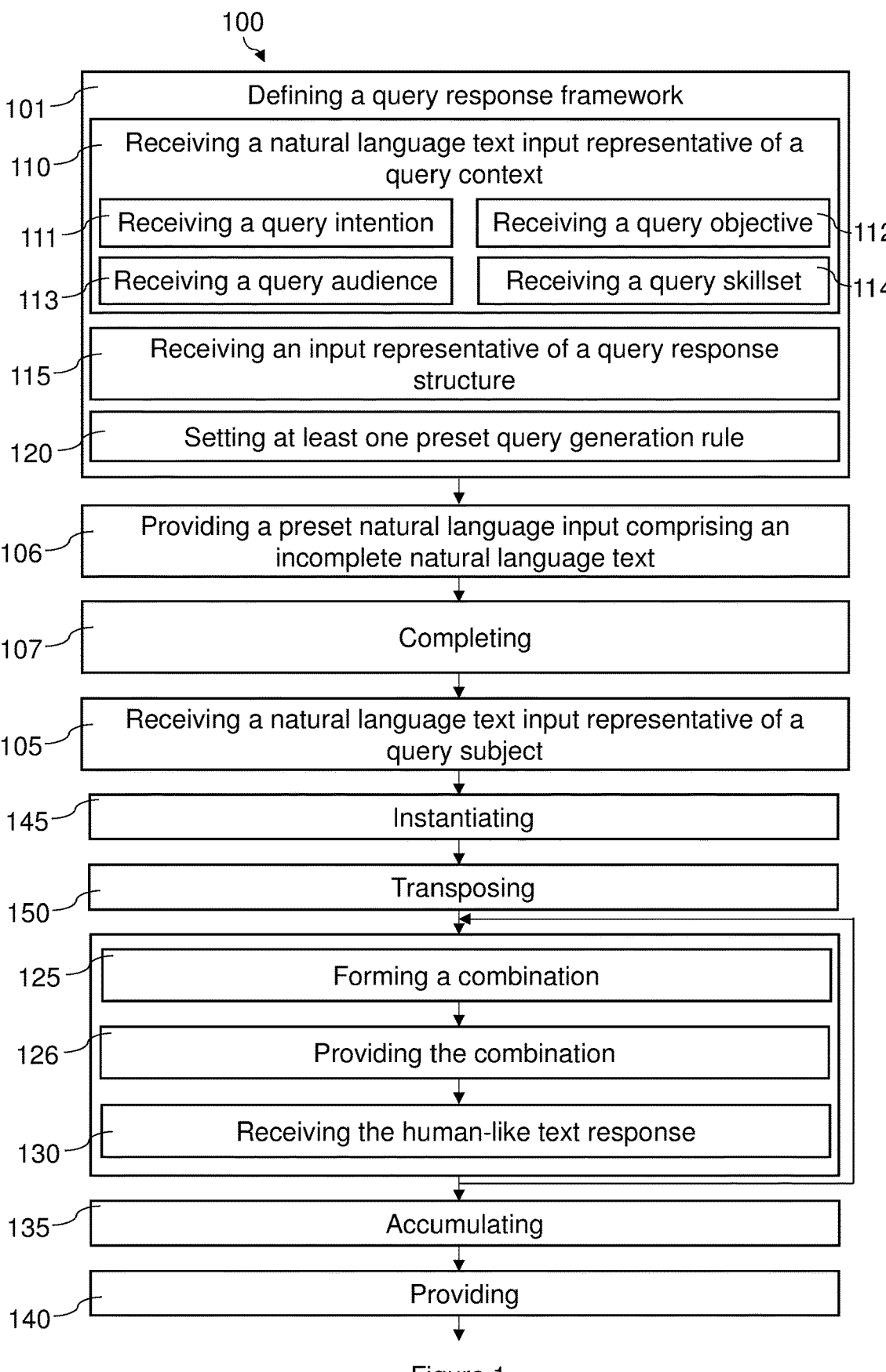

101 — Defining a query response framework

110 — Receiving a natural language text input representative of a query context

111 — Receiving a query intention          Receiving a query objective — 112

113 — Receiving a query audience          Receiving a query skillset — 114

115 — Receiving an input representative of a query response structure

120 — Setting at least one preset query generation rule

106 — Providing a preset natural language input comprising an incomplete natural language text 107 — Completing 105 — Receiving a natural language text input representative of a query subject 145 — Instantiating 150 — Transposing 125 — Forming a combination 126 — Providing the combination 130 — Receiving the human-like text response 135 — Accumulating 140 — Providing

SYSTEM FOR THE INTERPRETATION AND QUERYING OF CONTENT GENERATED BY AN ARTIFICIAL INTELLIGENCE MODEL

BACKGROUND OF THE INVENTION

The present disclosure pertains to the expansive and rapidly evolving field of artificial intelligence (AI), a discipline that encompasses a wide array of technical areas including machine learning, natural language processing, and deep learning. Within this broad field, the disclosure narrows its focus to the specialized sub-field of generative artificial intelligence models. These models, often powered by deep learning algorithms, are designed to generate new content that is similar to the input data they have been trained on.

Generative artificial intelligence models have found applications in a variety of sectors, from creating realistic images and synthesizing human-like text to generating music and even designing pharmaceutical drugs. In particular, the use of generative artificial intelligence models for natural language processing tasks has seen a surge in interest. These tasks often involve the generation of human-like text responses based on a given input, a capability that has profound implications for industries such as customer service, content creation, and digital marketing.

One common application of generative artificial intelligence models in the realm of natural language processing is the creation of chatbots or virtual assistants. These AI-powered entities are capable of understanding and responding to natural language queries, providing users with a more intuitive and human-like interaction experience. However, the quality and relevance of the responses generated by these models can vary greatly depending on parameters that are external to the query as such.

In particular, the quality of the response to the query depends on "model fatigue", which corresponds basically to the amount of computing power available at the time of sending the query, which results in irregular and variable responses to a singular input. This inconsistency can lead to a less than satisfactory user experience, as the same query can yield different responses depending on the available computing power at the time of query processing. This variability can undermine the reliability of the artificial intelligence model, making it less effective for applications that require consistent and reliable responses, such as customer service or digital marketing.

Furthermore, the precision and length of the content generated by the artificial intelligence model are influenced by the quality and length of the initial query. This means that the input query plays a substantial role in determining the output. A well-structured, detailed, and lengthy query is more likely to yield a precise and comprehensive response. Conversely, a short or vague query may result in a less precise and shorter response. This dependency can pose challenges, especially when the initial query lacks sufficient detail or length, potentially leading to less accurate or incomplete responses. This, in turn, requires the development of specific skills for users, known generally as "prompt engineering". However, such skills typically amount to query reformulation.

SUMMARY OF INVENTION

The present invention aims to solve at least part of the technical problems listed above.

As such, according to a first aspect, the present invention aims at a system for querying interpreted content from a generative artificial intelligence model, comprising:

a generative artificial intelligence model configured to accept an input in the form of a natural language text and configured to use deep learning to produce a human-like text response as a function of the accepted natural language text input; and one or more processors; and one or more non-transitory computer-readable media that collectively store instructions that, when executed by the one or more processors, cause the computing system to perform operations, the instructions being representative of steps of:

defining a query response framework, comprising:

receiving a natural language text input representative of a query context, and receiving an input representative of a query response structure, said structure comprising at least two individual segment type identifiers, setting at least one preset query generation rule, in the form of natural language to form a library of preset rules, each said preset query generation rule being associated with at least one segment type identifier, receiving a natural language text input representative of a query subject, for each segment type identifier:

forming a combination of the inputs representative of the query response framework and query subject, providing the combination to the generative artificial intelligence model, receiving the human-like text response generated by the generative artificial intelligence model as a function of the provided combination, accumulating the human-like text responses received for each segment to form a global query response, and providing the global query response to a computerized interface.

Thanks to these provisions, firstly, the system allows for more precise and comprehensive responses from the artificial intelligence model by amplifying the input query with preset rules. This can lead to improved user experience and more effective use of artificial intelligence in applications such as customer service or digital marketing. Secondly, the system addresses the issue of "model fatigue" by structuring the query in a way that reduces the dependency on the available computing power at the time of query processing. This can lead to more consistent and reliable responses from the artificial intelligence model. Thirdly, the system allows for the accumulation of responses to form a global query response, which can provide a more complete and detailed answer to the user's query. Fourthly, the use of preset query generation rules allows, for each segment, to obtain a different response from the artificial intelligence model targeting the subject of the query according to different conceptual query approaches, each query approach corresponding to a segment. For example, a query approach may correspond to a historical perspective on a subject. Another query approach may correspond to a legal perspective on a subject. By forcing the artificial intelligence model to provide two separate responses for each perspective or approach, the quality of the response is improved.

In particular embodiments, during the step of receiving an input representative of a query response structure, said structure comprises at least one sub-segment type identifier, said sub-segment type identifier being associated with a segment type identifier or with a sub-segment type identifier.

Such embodiments allow for a more granular and structured approach to query processing, which can enhance the precision and relevance of the artificial intelligence model's responses. By associating each sub-segment type identifier with a segment type identifier or another sub-segment type identifier, the system can better understand and interpret the context and intent of the query. This can lead to more accurate and contextually appropriate responses. Furthermore, this structure can help mitigate the effects of "model fatigue" by distributing the processing load across multiple sub-segments, potentially leading to more consistent and reliable responses.

In particular embodiments, the system object of the present invention further comprises:

prior to the step of receiving a natural language text input representative of a query subject, a step of providing, to a computerized interface, a preset natural language text input comprising an incomplete natural language text, a step of completing, by a user upon the computerized interface, the preset natural language text input by adding natural language text to the preset natural language text, said completed preset natural language text being used during the step of receiving a natural language text input representative of a query subject.

Such embodiments provide the following benefits: firstly, it guides the user in formulating a query, which can lead to more effective queries and better responses from the artificial intelligence model. Secondly, it can help ensure that the query is in a format that the artificial intelligence model can process effectively, which can improve the quality of the artificial intelligence model's responses. Thirdly, it can make the system easier to use, especially for users who are not familiar with formulating queries for artificial intelligence models.

In particular embodiments, at least one preset generation rules is defined by a hybrid query input, comprising both natural language text input and interpretable programming language text input, said hybrid query input being used during the step of forming a combination.

In such embodiments, the use of a hybrid query input allows the system can leverage the precision and expressiveness of programming languages to better specify the query, which can further enhance the quality of the artificial intelligence model's responses. This includes, in particular, creating routines of instructions to be interpreted, and not executed, by the artificial intelligence model.

The hybridization of natural language and interpretable programming language allows:

the interpretation of natural language by convention, which generates less subjective interpretation, which leads to better results, the destructuration of statistically identical probability-based results by introducing elements of randomness, the definition of the quantity of work to be performed by the generative artificial intelligence which leads to better respect of the instructions given, and the reduction in the length of the instructions given.

In particular embodiments, the step of interpreting comprises:

a step of dynamically instantiating interpretable programming language variables representative of natural language text elements as a function of at least one of:

the received natural language text input representative of a query subject, the received natural language text input representative of a query context, and the received input representative of a query structure, a step of transposing, in the hybrid query input, said natural language text elements by said instantiated variables in the interpretable programming language to form an adapted hybrid query input, said adapted hybrid query input being used during the step of forming a combination.

Such embodiments allow for a more nuanced and contextually aware processing of the query, potentially leading to more accurate and relevant responses from the artificial intelligence model. Furthermore, by incorporating programming language variables into the query, the system can leverage the precision and expressiveness of programming languages to better specify the query, which can further enhance the quality of the artificial intelligence model's responses.

In particular embodiments, at least one generation rule is configured to generate interpretable programming language text representative of an execution iteration as the function of a programming language variables representative of natural language text element.

Such embodiments allow for a more nuanced and contextually aware processing of the query, potentially leading to more accurate and relevant responses from the artificial intelligence model. Furthermore, by incorporating programming language variables into the query, the system can leverage the precision and expressiveness of programming languages to better specify the query, which can further enhance the quality of the artificial intelligence model's responses.

In particular embodiments, the step of defining a query response framework comprises a step of receiving a digital identifier representative of a query intention.

In particular embodiments, the step of defining a query response framework comprises a step of receiving a digital identifier representative of a query objective.

In particular embodiments, the step of defining a query response framework comprises a step of receiving a digital identifier representative of a query audience.

In particular embodiments, the step of defining a query response framework comprises a step of receiving a digital identifier representative of a query audience culture. Such a culture can correspond to a set of descriptor keywords of said culture.

In particular embodiments, the step of defining a query response framework comprises a step of receiving a digital identifier representative of a query skillset.

In particular embodiments, at least one preset generation rule is set as a function of the query skillset received.

In particular embodiments, the step of defining a query response framework comprises a step of receiving a digital identifier representative of a query objective.

Such embodiments allow for a more detailed and contextually relevant input for the artificial intelligence model, which can lead to more accurate and appropriate responses. It also provides a structured way to capture and represent various aspects of the query context, enhancing the system's ability to understand and respond to the user's query effectively.

According to a second aspect, the present invention aims at a computer-implemented method for querying interpreted content from a generative artificial intelligence model, comprising the steps of:

defining a query response framework, comprising:

receiving a natural language text input representative of a query context, and receiving an input representative of a query response structure, said structure comprising at least two individual segment type identifiers, setting at least one preset query generation rule, in the form of natural language to form a library of preset rules, each said preset query generation rule being associated with at least one segment type identifier, receiving a natural language text input representative of a query subject, for each segment type identifier:

forming a combination of the inputs representative of the query response framework and query subject, providing the combination to the generative artificial intelligence model, receiving the human-like text response generated by the generative artificial intelligence model as a function of the provided combination, accumulating the human-like text responses received for each segment to form a global query response, and providing the global query response to a computerized interface.

This second aspect provides the same benefits as the system object of the present invention.

Such an invention can be used in the context of omnidirectional communications structured by language, such as instruction reception and emission. Such an invention may impact several technical domains, industries, and sectors.

For example, and not limited to, such an invention may be used in the contexts of:

health and well-being: therapeutic automated conversation systems require a high and contextually aligned sensibility to bring adapter and relevant care and guidance to patients, education: crafting tailored and dedicated content requires alignment on teaching requirements and the level of students, pharmaceutical and medical research: automated and reliable synthesis and analysis of medical data requires alignment on norms.

It should be noted that the present invention can be understood by analogy to the dynamic determination of appropriate phraseology for a specific query.

As a reminder, phraseology is the study of set or fixed expressions, such as idioms, phrasal verbs, and other types of multi-word lexical units (often collectively referred to as phrasemes), in which the component parts of the expression take on a meaning more specific than, or otherwise not predictable from, the sum of their meanings when used independently.

Phraseology is concerned with the way in which these expressions are formed, their meaning, their use in discourse and their role in communication.

Phraseological expressions can include idioms, proverbs, collocations, fixed expressions and clichés. They are often rooted in culture and can vary considerably from one language to another, making them difficult to translate and interpret without knowledge of the cultural context.

Whereas traditional phraseology is interested in the contextual interpretation of phrasemes by human beings, the present invention is interested in defining the appropriate interpretation of phrasemes as a function of a determined and user-defined context for a generative artificial intelligence.

BRIEF DESCRIPTION OF FIGURES

Other advantages, purposes and particular characteristics of the invention shall be apparent from the following non-

Figure 2:
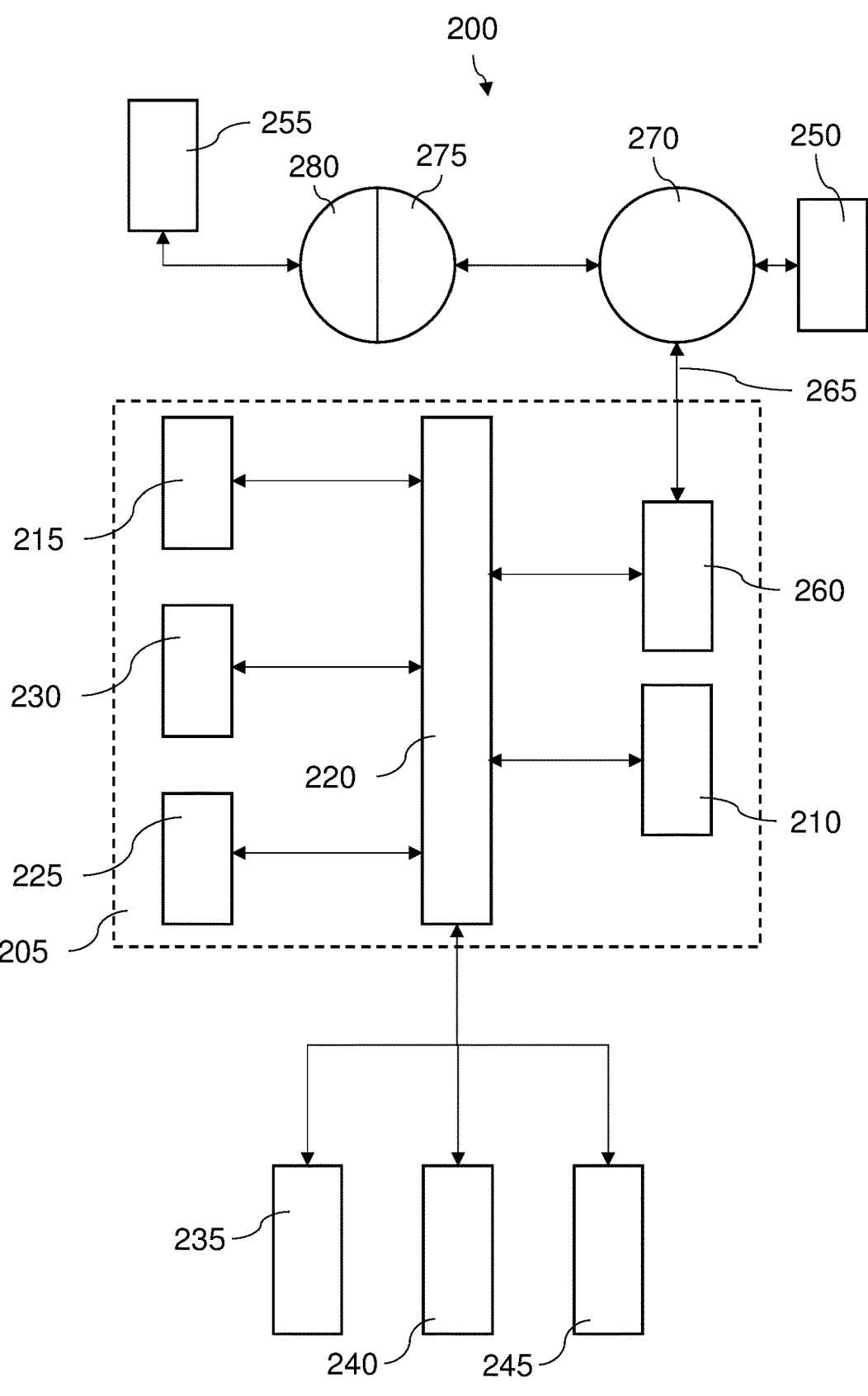
Figure 3:
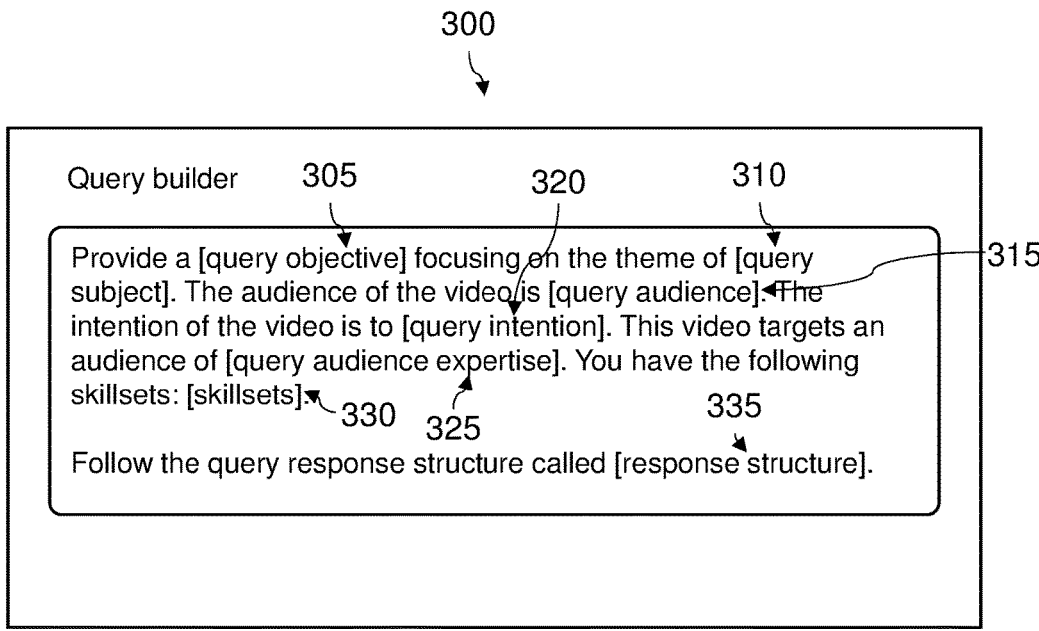
Figure 4:
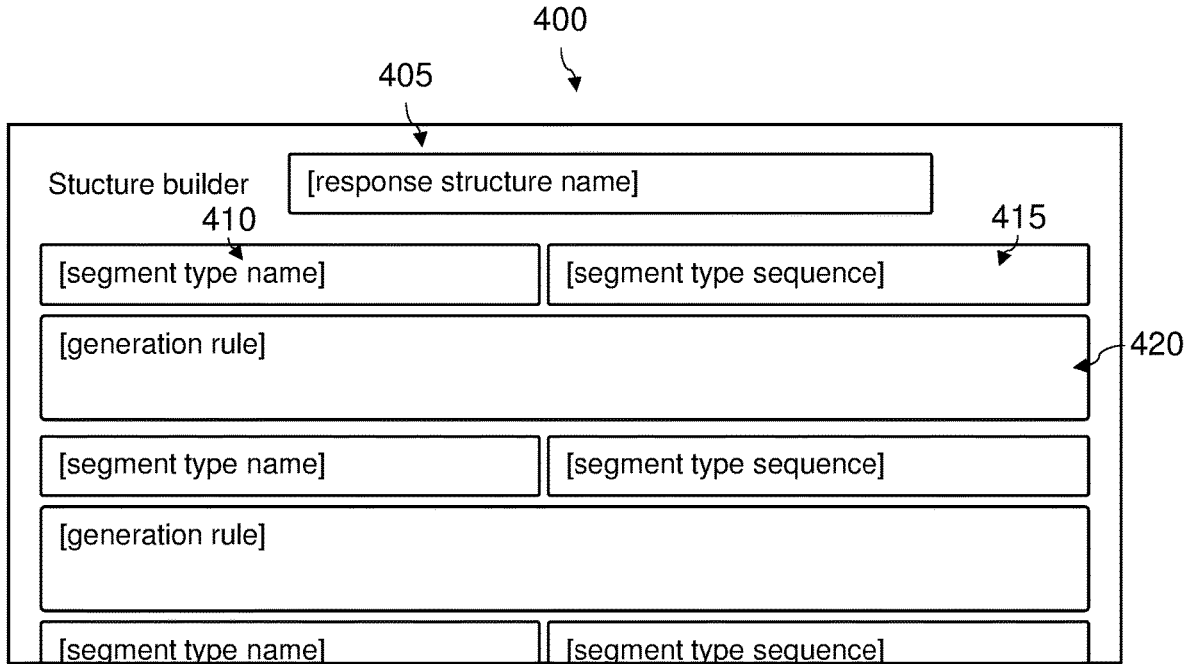

6 exhaustive description of at least one particular embodiment or succession of steps of the present invention, in relation to the drawings annexed hereto, in which:

FIG. 1 represents a flowchart representing a particular implementation of the method object of the present invention and the corresponding instructions used in the system of the present disclosure, FIG. 2 represents a block diagram illustrating a particular embodiment of a system object of the present invention, FIG. 3 represents an example of an incomplete natural text query to be filled by a user and FIG. 4 represents an example of a query response structure builder to be filled in by a user.

DETAILED DESCRIPTION

This description is not exhaustive, as each feature of one embodiment may be combined with any other feature of any other embodiment in an advantageous manner.

Various inventive concepts may be embodied as one or more methods, of which an example has been provided. The acts performed as part of the method 100 may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or lists of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

It should be noted at this point that the figures are not to scale.

FIG. 2 represents a block diagram that illustrates an example system 200 with which an embodiment of the method 100 and/or system 200 of the present invention may be implemented. In the example of FIG. 2, a computer system 205 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

The computer system 205 includes an input/output (IO) subsystem 220 which may include a bus and/or other communication mechanism(s) for communicating information and/or instructions between the components of the computer system 205 over electronic signal paths. The I/O subsystem 220 may include an I/O controller, a memory controller and at least one I/O port. The electronic signal paths are represented schematically in the drawings, for example as lines, unidirectional arrows, or bidirectional arrows.

At least one hardware processor 210 is coupled to the I/O subsystem 220 for processing information and instructions. Hardware processor 210 may include, for example, a general-purpose microprocessor or microcontroller and/or a special-purpose microprocessor such as an embedded system or a graphics processing unit (GPU) or a digital signal processor or ARM processor. Processor 210 may comprise an integrated arithmetic logic unit (ALU) or may be coupled to a separate ALU.

Computer system 205 includes one or more units of memory 225, such as a main memory, which is coupled to I/O subsystem 220 for electronically digitally storing data and instructions to be executed by processor 210. Memory 225 may include volatile memory such as various forms of random-access memory (RAM) or other dynamic storage devices. Memory 225 also may be used for storing temporary variables or other intermediate information during execution of instructions to be executed by processor 210. Such instructions, when stored in non-transitory computer-readable storage media accessible to processor 210, can render computer system 205 into a special-purpose machine that is customized to perform the operations specified in the instructions. Computer system 205 further includes non-volatile memory such as read only memory (ROM) 230 or other static storage device coupled to the I/O subsystem 220 for storing information and instructions for processor 210. The ROM 230 may include various forms of programmable ROM (PROM) such as erasable PROM (EPROM) or electrically erasable PROM (EEPROM). A unit of persistent storage 215 may include various forms of non-volatile RAM (NVRAM), such as FLASH memory, or solid-state storage, magnetic disk, or optical disk such as CD-ROM or DVD-ROM and may be coupled to I/O subsystem 220 for storing information and instructions. Storage 215 is an example of a non-transitory computer-readable medium that may be used to store instructions and data which when executed by the processor 210 cause performing computer-implemented methods to execute the techniques herein.

The instructions in memory 225, ROM 230 or storage 215 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 205 may be coupled via I/O subsystem 220 to at least one output device 235. In one embodiment, output device 235 is a digital computer display. Examples of a display that may be used in various embodiments include a touch screen display or a light-emitting diode (LED) display or a liquid crystal display (LCD) or an e-paper display. Computer system 205 may include other type(s) of output devices 235, alternatively or in addition to a display device. Examples of other output devices 235 include printers, ticket printers, plotters, projectors, sound cards or video cards, speakers, buzzers or piezoelectric devices or other audible devices, lamps or LED or LCD indicators, haptic devices, actuators, or servos.

At least one input device 240 is coupled to I/O subsystem 220 for communicating signals, data, command selections or gestures to processor 210. Examples of input devices 240 include touch screens, microphones, still and video digital cameras, alphanumeric and other keys, keypads, keyboards, graphics tablets, image scanners, joysticks, clocks, switches, buttons, dials, slides.

Another type of input device is a control device 245, which may perform cursor control or other automated control functions such as navigation in a graphical interface on a display screen, alternatively or in addition to input functions. Control device 245 may be a touchpad, a mouse, a trackball, or cursor direction keys for communicating direction information and command selections to processor 210 and for controlling cursor movement on display 235. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 240 may include a combination of multiple different input devices, such as a video camera and a depth sensor.

In another embodiment, computer system 205 may comprise an internet of things (IoT) device in which one or more of the output device 235, input device 240, and control device 245 are omitted. Or, in such an embodiment, the input device 240 may comprise one or more cameras, motion detectors, thermometers, microphones, seismic detectors, other sensors or detectors, measurement devices or encoders and the output device 235 may comprise a special-purpose display such as a single-line LED or LCD display, one or more indicators, a display panel, a meter, a valve, a solenoid, an actuator or a servo.

Computer system 205 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 205 in response to processor 210 executing at least one sequence of at least one instruction contained in main memory 225. Such instructions may be read into main memory 225 from another storage medium, such as storage 215. Execution of the sequences of instructions contained in main memory 225 causes processor 210 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage 215. Volatile media includes dynamic memory, such as memory 225. Common forms of storage media include, for example, a hard disk, solid state drive, flash drive, magnetic data storage medium, any optical or physical data storage medium, memory chip, or the like. Storage media is distinct from but may be used in conjunction with transmission media. Transmission media participates in transferring information between storage media. For example, transmission media includes coaxial cables, copper wire and fiber optics, including the wires that comprise a bus of I/O subsystem 220. Transmission media can also take the form of acoustic or light waves, such as those generated during radio-wave and infra-red data communications.

Various forms of media may be involved in carrying at least one sequence of at least one instruction to processor 210 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 205 can receive the data on the communication link and convert the data to a format that can be read by computer system 205. For instance, a receiver such as a radio frequency antenna or an infrared detector can receive the data carried in a wireless or optical signal and appropriate circuitry can provide the data to I/O subsystem 220 such as place the data on a bus. I/O subsystem 220 carries the data to memory 225, from which processor 210 retrieves and executes the instructions. The instructions received by memory 225 may optionally be stored on storage 215 either before or after execution by processor 210.

Computer system 205 also includes a communication interface 260 coupled to bus 220.

Communication interface 260 provides a two-way data communication coupling to network link(s) 265 that are directly or indirectly connected to at least one communication network, such as a network 270 or a public or private cloud on the Internet. For example, communication interface 260 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 270 broadly represents a local area network (LAN), wide-area network (WAN), campus network, internetwork, or any combination thereof. Communication interface 260 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 260 sends and receives electrical, electromagnetic, or optical signals over signal paths that carry digital data streams representing various types of information.

Network link 265 typically provides electrical, electromagnetic, or optical data communication directly or through at least one network to other data devices, using, for example, satellite, cellular, Wi-Fi, or BLUETOOTH technology. For example, network link 265 may provide a connection through a network 270 to a host computer 250.

Furthermore, network link 265 may provide a connection through network 270 or to other computing devices via internetworking devices and/or computers that are operated by an Internet Service Provider (ISP) 275. ISP 275 provides data communication services through a world-wide packet data communication network represented as internet 280. A server computer 255 may be coupled to internet 280. Server 255 broadly represents any computer, data center, virtual machine, or virtual computing instance with or without a hypervisor, or computer executing a containerized program system such as DOCKER or KUBERNETES. Server 255 may represent an electronic digital service that is implemented using more than one computer or instance and that is accessed and used by transmitting web services requests, uniform resource locator (URL) strings with parameters in HTTP payloads, API calls, app services calls, or other service calls.

Computer system 205 and server 255 may form elements of a distributed computing system that includes other computers, a processing cluster, server farm or other organization of computers that cooperate to perform tasks or execute applications or services. Server 255 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 255 may comprise a web application server that hosts a presentation layer, application layer and data storage layer such as a relational database system using structured query language (SQL) or no SQL, an object store, a graph database, a flat file system or other data storage.

Computer system 205 can send messages and receive data and instructions, including program code, through the network(s), network link 265 and communication interface 260. In the Internet example, a server 255 might transmit a requested code for an application program through Internet 280, ISP 275, local network 270 and communication interface 260. The received code may be executed by processor 210 as it is received, and/or stored in storage 215, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 210. While each processor 210 or core of the processor executes a single task at a time, computer system 205 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

As used herein, the term "digital identifier" refers to a specific piece of data or code that uniquely represents a particular entity, object, or concept in a digital context. It can be used to reference, track, or categorize digital information. Digital identifiers can take various forms, such as numbers, letters, symbols, or a combination thereof, and can be used in various contexts, such as databases, software applications, or online platforms.

As used herein, the term "natural language" refers to the languages that humans use for communication. Natural languages are complex and rich with nuance, context, and cultural and historical references. They are not designed or invented in the way that programming languages are, but rather, they evolve naturally over time.

As used herein, the term "programming language" refers to artificial languages created to express computations that can be performed by a machine, particularly a computer. They are designed with specific rules and syntax to instruct the computer to perform specific tasks. Examples of programming languages include Python, Java, C++, and many others. Unlike natural languages, programming languages are less ambiguous and have a strict syntax and grammar.

As used herein, the term "interpretable programming language" refers to a text input which is similar in structure to a programming language, which is not executed as such by an artificial intelligence receiving said text input but interpreted as a natural language input would be interpreted.

As used herein, the term "query subject" refers to the natural language text input that represents the subject of the query. The term "query context" refers to the natural language text input that provides context for the query. The term "query response structure" refers to the input that represents the structure of the query response. This structure comprises at least two individual segment type identifiers. Each segment type corresponds to a particular and user-defined perspective on the subject of the query.

Such a segment type may correspond, for example, to an historical perspective on the subject of the query, or to a legal perspective on the subject of the query.

As used herein, the term "human-like text response" is understood to mean a text response that mimics human language and thought patterns. The term "global query response" refers to the comprehensive response to the query, which is formed by accumulating the human-like text responses received for each segment.

The term "computerized interface" refers to the means by which the global query response is presented to the user. When considering output functionalities, in the context of FIG. 2, this interface can be an output device 235, such as a digital computer display. When considering input functionalities, in the context of FIG. 2, this interface can be an input device 240, such as a keyboard or touchscreen. Input/output functionalities combined may use a communication interface 260, which provides a two-way data communication coupling to network link(s) 265. The global query response, after being processed and generated by the system, is provided to this computerized interface for user interaction.

As used herein, the term "query subject" is understood to mean the main topic or focus of the query. The term "query context" refers to the surrounding circumstances or facts or arbitrary constraints that clarify the query subject. The term "query response structure" is understood to mean the format or layout in which the response to the query is presented. The term "segment type identifier" refers to a marker or tag that distinguishes one segment of the query response structure from another. The term "preset query generation rule" is understood to mean a predefined rule that guides the generation of the query. The term "amplified query" refers to the query that has been enhanced or expanded by the addition of at least one preset query generation rule.

The present disclosure relates to a system 200 and method 100 for querying interpreted content from a generative artificial intelligence model. The system 200 and method 100 accept an input in the form of natural language text and use deep learning to produce a human-like text response as a function of the accepted natural language text input. The system 200 comprises one or more processors and one or more non-transitory computer-readable media that collectively store instructions. When executed by the one or more processors, these instructions cause the computing system to perform a series of operations which are functionally similar to the steps of the method 100 object of the present invention. Therefore, in the below disclosure, describing the steps of the method 100 is equivalent to disclosing the technical result obtained by executing the stored instructions which correspond to said steps.

The system 200 is initially set by defining a response framework, which defines a series of parameters, such as context, objective, intention, query response generation rules and query response structure, defined by a series of segment type identifiers.

Such a framework may comprise a role for the generative artificial intelligence. Such a role may correspond to a mission set for the generative artificial intelligence regardless of the query subject of the user.

Such a framework may comprise generation rules, such as:

- a minimum query response length (in characters or words),
- a query response formatting rule,
- a list of criteria to be emphasized or minimized in the response,
- a defined skillset defined not only by a role for the generative artificial intelligence but also by defined rules corresponding to this role which corresponds to determined methodologies not subject to interpretation- such rules may correspond to, for example in the context of search engine optimization within the response:
  - identifying relevant key words for sub titles in the response, based on the target audience and key words provided,
  - associate each segment identifier to a specific key word, and
  - use said key words in the response by targeting a key word density of 1 to 1.5%.

A framework can be viewed as a reference and execution environment for a generative artificial intelligence. A framework can be defined by, in particular embodiments:

- multiple and variables objectives,
- wherein at least one objective implies multiple and variables roles and embodiments,
- wherein at least one role and embodiment involve multiple skills sets related to objectives and framework (and tacitly limited by objectives and framework).

The query designed by the user is thus inside a predefined framework (ask something or order something to execute in specific context of execution).

The system 200 receives a natural language text input representative of a query subject within the defined response framework. This allows for targeted and accurate responses by the generative artificial intelligence.

The query subject and the response framework are then provided, segment type identifier by segment type identifier, to the generative artificial intelligence and the output is collected and aggregated to form a global response.

This framework definition can be perceived as anthropomorphizing the generative artificial intelligence, derived from behaviorism sciences.

Such artificial intelligence behaviorism can be seen a paradigm according to which the observable behavior of a generative artificial intelligence is essentially conditioned by anthropomorphizing parameters, due to the anthropological and social aspects that these parameters intuitively induce and invoke (even by algorithmic probability), without there being any need for a precise description of the behavioral mode to be adopted. In fact, any data collected has been collected in a context. The interpretation of information is contextual, so is the interpretation of the mode of action, and does not depend solely on instructions.

The attribution of systematically contextualized characteristics invokes an expanded framework of contextual reference data, inducing more human behavior, because every context of language use is socially constituted by intentions and interactions. These intentions invoke invisible anthropological modalities, as well as an equally invisible applicable dimension of ethics through words.

FIG. 1 provides a flowchart representation of a particular method 100 object of the present invention. The steps disclosed in regard to this method 100 may also be implemented as instructions stored in the one or more non-transitory computer-readable media of the system object of the present invention 200.

This method 100 comprises a series of steps that are executed to query interpreted content from a generative artificial intelligence model. The steps comprise:

- defining a query response framework 101, comprising:
  - receiving a natural language text input representative of a query context 110, and
  - receiving an input representative of a query response structure 115, said structure comprising at least two individual segment type identifiers,
  - setting at least one preset query generation rule 120, in the form of natural language to form a library of preset rules, each said preset query generation rule being associated with at least one segment type identifier,
- receiving a natural language text input representative of a query subject 105,
- for each segment type identifier:
  - forming a combination 125 of the inputs representative of the query response framework and query subject,
  - providing the combination 126 to the generative artificial intelligence model,
  - receiving the human-like text response 130 generated by the generative artificial intelligence model as a function of the provided combination,
- accumulating the human-like text responses 135 received for each segment to form a global query response, and
- providing the global query response 140 to a computerized interface.

The step of defining a query response framework 101 has for objective to define a series of parameters the contextualize a user's query and also the generative artificial intelligence's response to said query.

This step of defining a query response framework 101 can be implemented in a variety of ways. One such method is through a user interface, which can be an input device 240, such as shown in FIG. 2, corresponding to a mouse, keyboard or touchscreen associated to a digital computer display, where a user or system administrator can define one or more query response frameworks. Each said query response framework can be associated with a query response framework identifier.

The method 100 object of the present invention may further comprise a step of selecting a query response framework, or a corresponding identifier, prior to executing the step of receiving a natural language text input representative of a query subject 105.

The step of receiving a natural language text input representative of a query context 110 can be similar, in structure and/or functions to embodiments of the step of receiving a natural language text input representative of a query subject 105, differing only in that the received information represents a context for a query subject.

The step of receiving a natural language text input representative of a query context 110 may further comprise at least one of:

a step of receiving a digital identifier representative of a query intention 111, a step of receiving a digital identifier representative of a query objective 112, a step of receiving a digital identifier representative of a query audience 113, and/or a step of receiving a digital identifier representative of a query skillset 114.

The step of receiving a digital identifier representative of a query intention 111 involves receiving a digital identifier that represents the user's intention or purpose behind the query. This can include the type of information the user is seeking, the action the user wants to perform, or the goal the user wants to achieve.

The step of receiving a digital identifier representative of a query objective 112 involves receiving a digital identifier that represents the objective or aim of the query. This can include the specific task the user wants to accomplish, the specific information the user wants to retrieve, or the specific problem the user wants to solve.

The step of receiving a digital identifier representative of a query audience 113 involves receiving a digital identifier that represents the intended audience of the query. This can include the specific group of people the user wants to reach, the specific demographic the user wants to target, or the specific user profile the user wants to engage.

The step of receiving a digital identifier representative of a query skillset 114 involves receiving a digital identifier that represents the skillset or expertise level relevant to the query. This can include the specific skills or knowledge the user possesses, the specific skills or knowledge the user wants to acquire, or the specific skills or knowledge the user expects the artificial intelligence model to have.

The steps of receiving a digital identifier representative of a query intention 111, and objective 112, an audience 113 and/or a skillset 114 can be similar, in structure and/or functions to embodiments of the step of receiving a natural language text input representative of a query subject 105, differing only in that the received information represents an intention, objective, audience and/or a skillset associated to the query subject.

The step of receiving an input representative of a query response structure 115 involves obtaining a specific input that outlines the structure or format of the desired response to a query. This structure comprises at least two individual segment type identifiers, which are markers or tags that distinguish one segment of the query response structure from another. Each segment type corresponds to a particular and user-defined perspective on the subject of the query. This step of receiving an input representative of a query response structure 115 allows the system to understand how the response to the query is to be structured, which in turn helps in generating a more organized and meaningful response. This also helps in reducing the impact of computation fatigue, by forcing the artificial intelligence model to generate content, segment after segment.

In particular embodiments, such as shown in FIG. 1, during the step of receiving an input representative of a query response structure 115, the structure is associated to at least one sub-segment type identifier. This sub-segment type identifier is associated with a segment type identifier or with another sub-segment type identifier. This allows for a more granular and structured approach to query processing, enhancing the precision and relevance of the artificial intelligence model's responses. A "sub-segment type" identifier may correspond to at least one generation rule. An amplified query can be obtained for each sub-segment type and the corresponding at least one generation rule, said amplified query being accumulated by segment type, to form the human-like text response.

As can be understood, sub-segments can be iteratively defined, to generate the desired level of granularity for a particular query. For example, segment type "A" can be associated with subsegments "A1", "A2" and "A3", and subsegment "A1" can be associated to sub-segments "A1a", "A1b" and "A1c". Each subsegment can correspond to a type of perspective on the query subject.

In the embodiment of a system such as shown in FIG. 2, a user interface serves as the primary medium for obtaining an input representative of a query response structure 115. This input, which includes at least two individual segment type identifiers, is directly provided by the user through an input device 240, such as a keyboard, mouse and/or touchscreen associated with a digital computer display. The query type can be selected within a list of preset segment type identifiers or freely input by a user.

In particular embodiments, not represented in FIG. 1, the method 100 object of the present invention comprises, upstream of the step of receiving an input representative of a query response structure 115, a step of defining a query response structure template.

This step of defining a query response structure template can be performed by using an input device 240 associated with a computing system 205 and a graphical user interface which displays a representation 400 of the input query response structure, such as shown in FIG. 4.

During this step of defining a query response structure template, a user or administrator may:

define a query response structure template name 405, such as shown in FIG. 4, define a query response structure segment name 410, such as shown in FIG. 4, define a query response structure segment sequence 415, such as shown in FIG. 4, that defines the order in which segments are used by the generative artificial intelligence model, define at least generation rule 420, such as shown in FIG. 4, associated with a particular segment type.

A generation rule can correspond to instructions, for the generative artificial intelligence, in natural text form, which define the particular rules for query response generation for this particular segment.

The step of setting at least one preset query generation rule can be implemented in a variety of ways. One such method is through a user interface, which can be an input device 240, such as shown in FIG. 2, corresponding to a mouse, keyboard or touchscreen associated to a digital computer display, where a user or system administrator can define one or more query generation rule. Each generation rule can be associated with a particular segment type identifier.

Each preset query generation rule is associated with at least one segment type identifier, which may correspond to a digital identifier representative of a type and/or number of a particular segment.

The term "query generation rule" refer to a predefined rule that guides the generation of a query. These rules are stored in a library of preset rules and are added to the combination of inputs representative of the query context and query subject to amplify or enhance the query. Each preset query generation rule is associated with at least one segment type identifier.

The step of receiving a natural language text input representative of a query subject 105 aims at the reception of a natural language text input that signifies the subject of the query. This can be implemented in a variety of ways. One such method is through a user interface, which can be an input device 240, such as shown in FIG. 2, corresponding to a mouse, keyboard or touchscreen associated to a digital computer display, where users can directly input their query subject. This can take the form of a search bar, a form field, or a chat interface, providing a direct and intuitive way for users to communicate their query.

Another method is the use of voice recognition software. This advanced technology can transcribe spoken language into text, enabling users to vocalize their query subject and have it seamlessly converted into a natural language text input. This can be facilitated by an input device 240, such as shown in FIG. 2, such as a microphone, that is coupled to the I/O subsystem 220.

The step of receiving a natural language text input representative of a query subject 105 can also leverage an API to receive the query subject from another software application. This method effectively integrates the system with other software or services, expanding its capabilities and potential use cases. This can be facilitated by the communication interface 260, such as shown in FIG. 2, which provides a two-way data communication coupling to network link(s) 265, such as shown in FIG. 2.

File uploads offer another method for receiving the query subject. In this case, the query subject is encapsulated in a text file or other document. The system then extracts the query subject from the uploaded file, providing a flexible and user-friendly way to input queries.

The system can also implement automated processes or scripts that generate and submit the query subject. This is an ideal solution for batch processing or automated testing, demonstrating the system's versatility and adaptability. This can be executed by the hardware processor 210, such as shown in FIG. 2, which is coupled to the I/O subsystem 220, such as shown in FIG. 2, for processing information and instructions.

The method 100 object of the present invention further comprises a step of forming a combination 125. During this step of forming a combination, an input combining query response framework data and natural text input representative of a subject data are combined, through concatenation for example.

In particular embodiments, such as disclosed in relation to the system 200 shown in FIG. 2, combination is provided to the generative artificial intelligence model through the processor 210. The processor 210, which is coupled to the I/O subsystem 220, processes the amplified query as per the instructions stored in the memory 225. These instructions, when executed, cause the processor 210 to provide the combination to the generative artificial intelligence model. Alternatively, the combination can be provided to the generative artificial intelligence model via an API through the communication interface 260.

The method 100 object of the present invention further comprises a step of receiving 130 the human-like text response generated by the generative artificial intelligence model as a function of the amplified query.

In particular embodiments, such as disclosed in relation to the system 200 shown in FIG. 2, the human-like text response generated by the generative artificial intelligence model is received by the processor 210. The processor 210, which is coupled to the I/O subsystem 220, processes the human-like text response as per the instructions stored in the memory 225. These instructions, when executed, cause the processor 210 to receive the human-like text response from the generative artificial intelligence model.

The method 100 object of the present invention further comprises a step of accumulating 135 to form a global query response. The term "global query response" refers to the comprehensive response to the query, which is formed by accumulating the human-like text responses received for each segment. This global query response provides a complete and comprehensive answer to the query.

This step of accumulating 135 can be performed by concatenating the human-like text responses for all or part of the amplified queries provided to the generative artificial intelligence.

The method 100 object of the present invention further comprises a step of providing the globally query response to a computerized interface 140.

In particular embodiments, such as shown in FIG. 1, the method 100 and corresponding system 200 of FIG. 2, further comprises:

prior to the step of receiving a natural language text input representative of a query subject 105, a step of providing, to a computerized interface, a preset natural language text input 106 comprising an incomplete natural language text, a step of completing 107, by a user upon the computerized interface, the preset natural language text input by adding natural language text to the preset natural language text, said completed preset natural language text being used during the step of receiving a natural language text input representative of a query subject 105.

The step of providing, to a computerized interface, a preset natural language text input 106 comprising an incomplete natural language text can be executed, for example, by the system 200 shown in FIG. 2.

In such an embodiment, the system 200 generates an incomplete natural language text input 300, such as shown in FIG. 3. This incomplete text input is then displayed on a computerized interface, which can correspond to an input device 240, such as a keyboard, mouse or touchscreen interacting with a digital interface. This incomplete natural language text input can correspond to a preset template, for example.

The incomplete text input serves as a prompt or template for the user, guiding the user in formulating a query.

During the step of completing 107, the user can complete this preset text input by adding their own natural language text to it. This can be done through various input devices 240, such as a keyboard or a touch screen.

For instance, if the system 200 is being used to query a database about a specific topic, the preset natural language text input might be a sentence or question that is partially filled out, with a blank space for the user to input the specific topic they are interested in. The user's completion of this preset text input forms the query subject, which is then used in the subsequent steps of the method 100.

For example, during this step of completing 107, a user may fill in, either through free expression or selection in a list of preset terms:

a query objective 305, such as shown in FIG. 3, a query subject 310, such as shown in FIG. 3, a query audience 315, such as shown in FIG. 3, a query intention 320, such as shown in FIG. 3, a query audience expertise 325, such as shown in FIG. 3, a query generation skillset 330, such as shown in FIG. 3, and/or a query structure template identifier 335, such as shown in FIG. 3.

In particular embodiments, such as shown in FIG. 1, the system includes a step of interpreting a combination of the received natural language text input representative of a query subject, the received natural language text input representative of a query context, and the received input representative of a query structure. This step of interpreting generates a hybrid query input, comprising both natural language text input and programming language text input, which is provided to the generative artificial intelligence model.

In particular embodiments, such as shown in FIG. 1, the step of interpreting includes dynamically instantiating programming language variables representative of natural language text elements in the combination of the received inputs. These instantiated variables replace the natural language text elements in the combination, forming the hybrid query input.

In such embodiments, the one or more processor 210, as shown in FIG. 2, execute instructions stored in the memory 225 to interpret the combination of the received inputs. These instructions dynamically instantiate programming language variables representative of natural language text elements in the combination. The instantiated variables replace the natural language text elements in the combination, forming the hybrid query input.

This hybrid query input, which effectively combines the precision of programming languages with the expressiveness of natural language, is then provided to the generative artificial intelligence model. The model, which is configured to accept an input in the form of a natural language text and use deep learning to produce a human-like text response, processes the hybrid query input to generate the response.

In particular embodiments, at least one preset generation rule is defined by a hybrid query input, comprising both natural language text input and interpretable programming language text input, said hybrid query input being used during the step of forming a combination. Such a preset generation rule may further correspond to a preset generation rule template, which comprises variables with no set value. These variables may be instantiated as a function of the query subject input by a user.

In particular embodiments, such as shown in FIG. 1, the method 100 further comprises:

a step of dynamically instantiating 145 interpretable programming language variables representative of natural language text elements as a function of at least one of:

the received natural language text input representative of a query subject, the received natural language text input representative of a query context, and the received input representative of a query structure, and a step of transposing 150, in the hybrid query input, said natural language text elements by said instantiated variables in the interpretable programming language to form an adapted hybrid query input, said adapted hybrid query input being used during the step of forming a combination.

During the step of dynamically instantiating 145, a variable in a preset generation rule may be instantiated as a function of the query subject input by a user.

During the step of transposing 150, a variable identifier may replace a part of a query subject or of a combination of query subject and query framework.

In particular embodiments, such as shown in FIG. 1, the step of interpreting is configured to generate programming language text representative of an execution iteration as the function of a programming language variables representative of natural language text element. This allows for a more nuanced and contextually aware processing of the query.

Such programming language text representative of an execution iteration are also referred to as "loops", representative of instructions such as "for each segment, depending on the segment type, amplify the query by adding generation rules extracted from a table which associates segment type and generation rules, based upon the segment type of this segment".

The step of interpreting can be performed prior to any amplification 120 of the query, in which case the amplification is executed upon the hybrid query, or downstream of query amplification 120, in which case individual hybrid queries are obtained for each amplified query or grouped hybrid queries are obtained from the combination of all amplified queries.

In particular embodiments, the step of interpreting is performed downstream of at least one step of amplifying 120 and is configured to interpret the amplified query. This allows the system to first enhance the query using preset rules, and then interpret the enhanced query, leading to a more precise and comprehensive query input for the artificial intelligence model.

In particular embodiments, such as shown in FIG. 1, the step of interpreting is performed downstream of each step of amplifying 120 and is configured to interpret a combination of amplified queries. This leads to a more comprehensive and precise query input for the artificial intelligence model, potentially resulting in more accurate, contextually appropriate, and detailed responses from the artificial intelligence model.

The invention claimed is:

1. A system to query interpreted content from a generative artificial intelligence model, comprising:

a computerized database including a plurality of prestored query response structures, each of which includes at least two individual segment type identifiers, and at least one query generation rule associated with each one of the segment type identifiers;

a computerized input device configured to receive a natural language text input, said text input includes a query subject, query context, and a structure template identifier representative of a selected query response structure;

a computerized interface configured to display a human-like text response;

a computerized circuitry having a generative artificial intelligence model configured to accept said text input and configured to use deep learning to produce said human-like text response as a function of the accepted natural language text input; and one or more processors; and one or more non-transitory computer-readable media that collectively store instructions that, when executed by the one or more processors, cause the one or more processors to perform operations, the instructions being representative of steps of:

receiving said text input from said computerized input device;

defining a query response framework, including said query context, and said selected query response structure;

receiving from said computerized database segment type identifiers of said selected query response structure, and said at least one query generation rule associated with each one of the segment type identifiers of the selected query response structure;

for each segment type identifier of the selected query response structure:

forming a data combination through concatenation, including of the inputs representative of the query context, the segment type identifier, the query generation rule associated with the segment type identifier, and query subject, providing the data combination to the generative artificial intelligence model, receiving the human-like text response generated by the generative artificial intelligence model as a function of the provided data combination, accumulating the human-like text responses received for each segment to form a global query response, and displaying the global query response on said computerized interface.

2. The system according to claim 1, in which, during the step of receiving an input representative of a query response structure, said structure comprises at least one sub-segment type identifier, said sub-segment type identifier being associated with a segment type identifier or with a sub-segment type identifier.

3. The system according to claim 1, which further comprises:

prior to the step of receiving a natural language text input representative of a query subject, a step of providing, to a computerized interface, a preset natural language text input comprising an incomplete natural language text, a step of completing, by a user upon the computerized interface, the preset natural language text input by adding natural language text to the preset natural language text, said completed preset natural language text being used during the step of receiving a natural language text input representative of a query subject.

4. The system according to claim 1, in which at least one preset generation rules is defined by a hybrid query input, comprising both natural language text input and interpretable programming language text input, said hybrid query input being used during the step of forming a combination.

5. The system according to claim 4, which further comprises:

a step of dynamically instantiating interpretable programming language variables representative of natural language text elements as a function of at least one of:

the received natural language text input representative of a query subject, the received natural language text input representative of a query context, and the received input representative of a query structure, a step of transposing, in the hybrid query input, said natural language text elements by said instantiated variables in the interpretable programming language to form an adapted hybrid query input, said adapted hybrid query input being used during the step of forming a combination.

6. The system according to claim 1, in which the step of defining a query response framework comprises a step of receiving a digital identifier representative of a query intention.

7. The system according to claim 1, in which the step of defining a query response framework comprises a step of receiving a digital identifier representative of a query objective.

8. The system according to claim 1, in which the step of defining a query response framework comprises a step of receiving a digital identifier representative of a query audience.

9. The system according to claim 1, in which the step of defining a query response framework comprises a step of receiving a digital identifier representative of a query skillset.

10. The system according to claim 9, in which at least one preset generation rule is set as a function of the query skillset received.

11. The system according to claim 1, in which the step of defining a query response framework comprises a step of receiving a digital identifier representative of a query objective.

12. The system of claim 1, wherein said computerized input device is further configured to receive input text representative of a query response structure including at least two segment type identifiers and at least one preset query generation rule associated with each segment type identifier; and, wherein said one or more processors are configured to add said query response structure to said plurality of prestored query response structures in said computerized database.

13. A computer-implemented method to query interpreted content from a generative artificial intelligence model, comprising the steps of:

receiving a text input, said text input is a natural language text including a query subject, query context, and a structure template identifier representative of a selected query response structure, wherein said query response structure is selected from a library of a plurality of prestored query response structures, each of which includes at least two individual segment type identifiers, and at least one query generation rule associated with each one of the segment type identifiers;

defining a query response framework, including said query context, and said selected query response structure;

receiving from said library segment type identifiers of said selected query response structure, and said at least one query generation rule associated with each one of the segment type identifiers of the selected query response structure;

for each segment type identifier of the selected query response structure:

forming a data combination through concatenation, including of the inputs representative of the query context, the segment type identifier, the query generation rule associated with the segment type identifier, and query subject, providing the data combination to the generative artificial intelligence model, receiving the human-like text response generated by the generative artificial intelligence model as a function of the provided combination, accumulating the human-like text responses received for each segment to form a global query response, and providing the global query response to a computerized interface.

* * * * *